United States Patent Office 3,264,038
Patented August 2, 1966

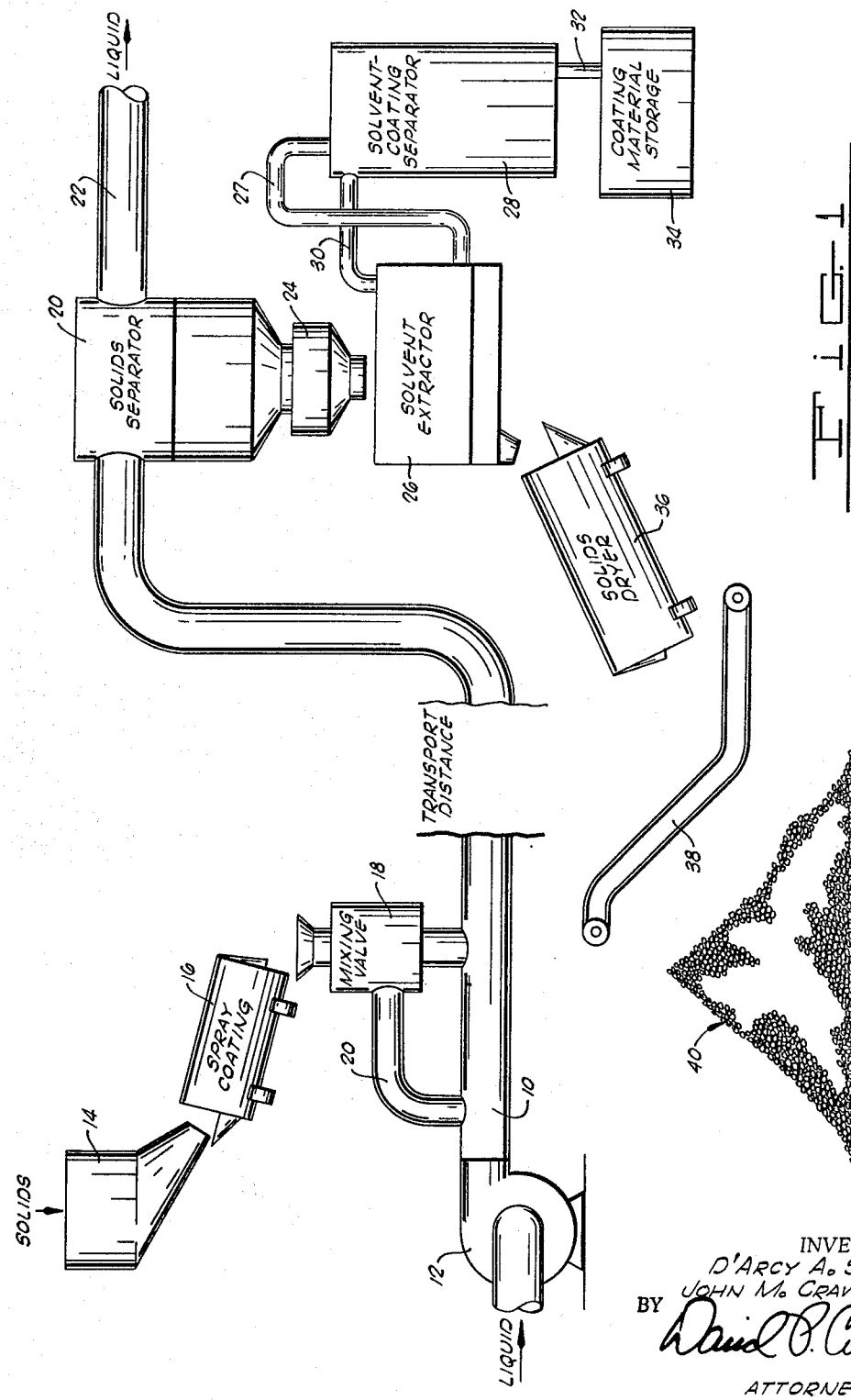

3,264,038
PROCESS FOR TRANSPORTING SOLIDS IN PIPELINES
D'Arcy A. Shock and John M. Crawford, both of Ponca City, Okla., assignors to Continental Oil Company, Ponca City, Okla., a corporation of Oklahoma
Filed July 8, 1964, Ser. No. 381,168
6 Claims. (Cl. 302—66)

This invention relates to a process for transporting solids in a pipeline simultaneously with the movement of a liquid through the pipeline. More particularly, the present invention relates to a process for transporting in a pipeline used to convey a liquid from one point to another, a solid which is soluble in, or reactive with, such liquid.

In the technology of transporting materials by pipeline, it has become a widespread practice to move a plurality of materials through the pipeline simultaneously, either in a segregated arrangement in which the materials are physically separated from each other as by the use of godevils, plugs or other physical barriers, or in physical admixture with each other. The latter instance includes the transport of solid materials in intimate physical mixture with liquid materials, either in the form of slurries, dispersions or stable suspensions. It is also presently a practice in the technology of pipeline transport to sometimes dissolve solid materials in a transporting liquid at the point of origin of the transport, and then to remove by suitable extraction or separatory procedures, the dissolved solid from the liquid at the destination of the materials.

Although solution of the solid in the carrier liquid frequently provides an advantage from the standpoint of the total amount of solid which may be transported using a given volume of liquid and over a fixed period of time, there are many situations in which solution of the solid to be transported in the liquid is highly undesirable because of the resulting contamination of the liquid, and the difficulty in restoring the liquid to a high state of purity by efficiently extracting or separating substantially all of the dissolved solid therefrom after the materials reach their destination. Thus, where the problem is confronted of transporting simultaneously through a single pipeline, a liquid and a solid which is soluble in the liquid with the requirement present that the liquid be maintained in a high state of purity and the solid retained in a state free of contamination by the transporting liquid, no feasible procedure for such transport has yet been proposed.

The present invention comprises a novel method for transporting simultaneously through a common pipeline, a liquid and a solid which is soluble in, or reactive with, the liquid. The process of the invention is highly useful in that it permits both the transported solid and the the transported liquid to be maintained in a high state of purity without the occurrence of mutual contamination or chemical change by interraction, and also simplifies separatory procedures for isolating the two components from each other at the destination terminal. Broadly described, the process of the invention compirses coating the solid to be transported with a coating material which is insoluble in and unreactive with, the liquid carrier material with which the solid is to be transported and which is, or sets up to, a solid or semi-solid capable of withstanding the mechanical abrasion encountered during movement through a pipeline. The coated material is then slurried with the carrier liquid and transported as a slurry of solid and liquid through a pipeline. Subsequently, the coated solid is separated from the liquid material. In most instances, it will be desired to include as a final step of the process, the removal of the coating material from the solid, although it is conceivable that it may be desirable in some instances to use a solid in its coated state in some types of processes.

It will be perceived from the broad description of the invention that the coating which is applied to the solid to shield or protect the solid from contact with the transported liquid renders the solid substantially insoluble in the solid and prevents contamination of the liquid by solution therein of the solid. Conversely, the solid is protected from contamination by the liquid and is maintained in a high state of purity. It will further be perceived that the basic principles of the invention can also be applied to solids which, though not soluble in the transported liquid in the purest sense of the term, may be reactive with the liquid if any substantial portion of the surface area of the solid is exposed to the liquid. In the latter application of the process, reaction between the solid material and the liquid is prevented by the protective coating which is applied to the solid material.

From the foregoing description of the invention, it will be apparent that a major object of the invention is to provide an improved procedure for simultaneously transporting through a common pipeline, a carrier liquid and a solid which is soluble in such liquid.

Another object of the invention is to provide a method for simultaneously transporting a liquid in a solid which is soluble in such liquid so as to preserve the state of purity of both the solid and the liquid, and to obviate mutual contamination of each by the other.

An additional object of the present invention is to enhance the case with which a solid material which is soluble in a liquid may be separated from such liquid after the two materials have been simultaneously transported through a pipeline.

Another object of the present invention is to provide a process for transporting a solid material which is reactive with a liquid material simultaneously with such liquid material through a common pipeline.

In addition to the foregoing described objects and advantages, additional objects and advantages will become apparent as the following detailed disclosure of the invention is read in conjunction with the sole accompanying drawing which schematically illustrates the process of the present invention and generally suggests apparatus which may be employed in practicing the invention.

The method of the invention may be best understood by referring to the accompanying drawing which schematically illustrates in a general way the apparatus which may be employed in carrying out the steps of the method. A liquid which is to be moved through a pipeline from one location to another is introduced to the pipeline 10 through a suitable pump 12. It is desired to transport through the pipeline 10 simultaneously with such liquid, a solid material which is either soluble in the liquid or reactive therewith. It is further desired to minimize contamination of the liquid by the solid, and to prevent, insofar as possible, contact between these materials.

To the end of accomplishing such simultaneous conveyance of materials while minimizing mutual contamination, the solids which are to be transported in the carrier liquid are introduced via a suitable hopper 14 to a rotary spray coating device 16 in which the solids are tumbled about in a rotating drum while being contacted with a coating liquid which is sprayed into the drum from suitable perforated pipes located therein (not seen in the schematic drawing). The nature of the coating material which is used to coat the solid particulate material introduced to the rotary spray coating drum 16 is such that the coating may be subsequently removed by solvent action without deleteriously affecting the solid, or may be recovered in any other way which avoids destroying or chemically changing the solid. It will be understood, of course, that the liquid coating material sets up to a non-liquid, i.e., solid, semi-solid, or gelatinous state, forming a shell or protective layer around the particles of the solid which obviates contact between the solvent and the transporting liquid moving in the pipeline 10. The coating material may be dissolved in a volatile solvent for purposes of applying the coating to the solid particles with the solvent then being evaporated by heating or aeration. Any other suitable method of coating application may be employed.

After the solid particles have been completely coated with the coating material in the rotary spray coating drum 16, the coated particles are discharged from the drum into a mixing valve 18 through which is circulated via a by-pass conduit 20, a portion of the liquid which is moving in the pipeline 10. In the mixing valve 18, the coated solid particles are thoroughly mixed with the liquid from the pipeline 10 to form a pumpable slurry having density and viscosity characteristics which facilitate its movement in the pipeline 10. Ordinarily a slurry not more than about 90% by weight solids will be formed, although from about 40% to about 60% by weight is preferred. In some situations, it may be desirable to divert to the entire stream of liquid flowing in the pipeline 10 through a mixing valve or other suitable mixing device for the purpose of forming the slurry so that the slurry composition and physical properties may be more precisely controlled than can be the case where only a portion of the liquid stream from the pipeline is diverted through the mixing valve.

After the slurry developed in the mixing valve 18 has been reintroduced to the pipeline 10, the slurry is pumped through the pipeline over the distance which it is desired to move both the coated solid and the liquid. This distance may, of course, be a number of miles. Techniques and procedures for minimizing difficulties resulting from abrasion, turbulent effects, joints in the pipeline and similar conditions are well-known in the art.

After the slurry transported through the pipeline 10 has arrived at the destination or terminal where the coated solid material is to be stored or otherwise employed, the slurry is passed through a solids separator 20 where the coated solids are removed from the liquid. Various types of separators are well-known in the art, and the selection of a suitable separator will be dependent to some extent, of course, upon the chemical and physical properties of the liquid and the coated solid which is dispersed therein. In most instances, centrifugal separation will be quite effective, although with other solid liquid systems, gravity settling may be more desirable. Filtration can also be employed under some circumstances.

After the separation of the solids and liquids has been accomplished, the liquid can be further transmitted through a pipeline 22 to a destination more distally removed from the source of the materials than the destination of the coated solids, or the liquid can be circulated through pipeline 22 to a storage or use facility in the immediate vicinity of the point of disposal of the solids content of the slurry. The solids which are separated from the slurry by the solids separator 20 are passed through a suitable solids feed device 24 to a solvent extractor unit 26. Here, according to one embodiment of the invention, the coated solid particles are treated to remove the coating material from the solids, thus permitting recovery of both the coating material and the solids in a relatively pure form. One method by which the coating material may be removed from the solid particles is by the process of solvent extraction. In solvent extraction, a solvent in which the coating material is soluble is intimately contacted with the coated particles to remove by extraction the coating while permitting the solid particles to settle to the bottom of the extractor.

The extract from the solvent extractor 26 is passed through a conduit 27 to a solvent-coating separator 28 in which the solvent and dissolved coating material are separated by fractional distillation or other similarly effective technique presently known to the art. The solvent which is separated from the solute in the separator 28 can be recycled via the conduit 30 to the solvent extractor unit 26, or can be conveyed to additional scrubbing and purifying apparatus (not illustrated) to remove residual traces of the coating material if this is necessary or desirable. The coating material is discharged from the solvent-coating separator through a conduit 32, and is conveyed through this conduit to a suitable coating material storage tank 34 or to any other situs providing a more desirable disposition of the coating material.

It will be apparent, of course, that from the coating material storage tank 34, the coating material can be periodically reconveyed by tank truck or other suitable method of transport to the spray coating drum 16 for reutilization in coating solid particles for transport in the pipeline 10, or the coating material from the storage tank 34 can be utilized to coat other solid particles which are to be transported back through the pipeline 10 in the reverse direction from that which has been described in discussing the invention to this point.

It should be further noted at this point in the discussion that it is not essential to the usefulness of the present invention or to its novelty to pass the coated solid particles from the solids separator 20 to the solvent extractor unit 26 for the purpose of removing the coating material from the solid particles. Under some circumstances of practicing the method of the invention, it may be desirable to use the coated solids in some process in their coated state. It may also be desirable at times to transfer the coated solids to a different pipeline carrying a different liquid in which the solid per se is soluble, or with which the solid is reactive, and for such purpose, it is desirable to permit the particles to remain coated, provided the coating material originally employed is substantially insoluble in, and non-reactive with, the new transporting liquid.

In instances where the coating material is removed from the solid particles such as, for example, by the use of a solvent extractor 26, the separated solids are then transferred to a solids drying apparatus 36, such as a rotary kiln, to remove residual traces of solvent and coating material from the particles. After the solids are thoroughly dried they may be disposed of in any desired fashion, such as by conveyance over a suitable conveyor 38 to a solids storage facility as represented generally in the drawing by reference character 40.

Examples of materials to which the method of the present invention may be applied for the purpose of permitting simultaneous transport of materials through a common pipeline include the coating of such water-soluble inorganic chemicals as ammonium nitrate, soda ash, ammonium sulphate, sodium sulphate and borax with an inexpensive wax which is readily soluble in various hydrocarbon solvents. The wax-coated inorganic materials are then slurried in water and pumped through a common pipeline, then removed from the water at the destination of the solid materials, treated with a hydrocarbon to remove the wax coating and used for any purpose desired.

Typical examples of hydrocarbon-soluble chemicals which might be transported simultaneously with oil, kerosene, or alcohol through a common pipe line are naphthalene, asphalt solids and gilsonite. The coating material utilized can be a water-soluble resin, sugar or starch, which material can be removed by contacting the coated solids with water at the destination.

Another application of the process of the invention which may be mentioned by way of example is that of coating anhydrous salts such as magnesium chloride and sodium carbonate with wax or other inert hydrocarbon coating material prior to forming a water slurry of the coated salts for transporting the material simultaneously through a pipeline carrying water or an aqueous solution of other materials. The hydrocarbon coating of the anhydrous materials will prevent their exposure to water to prevent their becoming hydrated or bonded chemically to water of hydration.

Although a specific embodiment of the present invention has been hereinbefore illustrated, and has been described in considerable detail, it is to be understood that other systems of different construction, and slight innovations in the steps of the method hereinbefore described, may be employed without departing from the usage of the basic principles which underlie the invention. Insofar, therefore, as any innovations and modifications in the invention hereinbefore described do not entail a departure from the basic concepts which underlie and form the basis for the invention, such innovations and modifications are deemed to be circumscribed by the spirit and scope of the invention except as the same may be necessarily limited by the appended claims or reasonable equivalents thereof.

What is claimed is:

1. A process for transporting a liquid and a comminuted solid, said solid being unstable in said liquid, simultaneously through a common pipeline comprising:
    coating the solid particles with a coating material which is solid and insoluble in and unreactive with said liquid under the conditions of transportation;
    intimately mixing the coated solid particles with said liquid to form a pumpable slurry;
    pumping said slurry through said pipeline to a destinaton; and
    removing the coated solid particles from the liquid.

2. A process as defined in claim 1 wherein said coating material is removed from said solid particles after said coated particles are removed from the liquid.

3. A process as defined in claim 1 wherein said solid is soluble in said liquid.

4. A process as defined in claim 1 wherein said solid is chemically reactive with said liquid.

5. A process as claimed in claim 4 wherein said solid is in an anhydrous state prior to the coating thereof, said liquid is water, and said solid is reactive with water to form hydrated compounds.

6. A process for simultaneously transporting a solid in particulate form and a liquid comprising:
    spraying a liquid coating material on the solid particles;
    converting the liquid coating material to a solid coating surrounding each particle of solid;
    mixing the coated solid particles with said liquid to form a pumpable slurry;
    simultaneously moving the liquid and coated solid particles as a slurry through a common pipeline to the destination of one of the simultaneously transported materials;
    separating the coated solid particles from the liquid; and
    removing the coating material from the solid particles by solvent extraction.

References Cited by the Examiner

UNITED STATES PATENTS

| | | | |
|---|---|---|---|
| 2,128,913 | 9/1938 | Burk | 302—66 |
| 2,610,900 | 9/1952 | Cross | 302—66 |
| 2,686,085 | 8/1954 | Odell | 302—66 |

FOREIGN PATENTS

| | | |
|---|---|---|
| 711,105 | 6/1954 | Great Britain. |
| 939,018 | 2/1956 | Germany. |

EVON C. BLUNK, *Primary Examiner.*

ANDRES H. NIELSEN, *Examiner.*